United States Patent [19]

Catenacci

[11] Patent Number: 5,125,774

[45] Date of Patent: Jun. 30, 1992

[54] BORING BAR CUTTER TOOL

[76] Inventor: Thomas C. Catenacci, 45533 Dover, Mt. Clemens, Mich. 48044

[21] Appl. No.: 717,421

[22] Filed: Jun. 18, 1991

[51] Int. Cl.$^5$ .............................................. B23B 51/00
[52] U.S. Cl. ...................................... 408/232; 407/49; 407/108; 408/233
[58] Field of Search ........... 408/144, 199, 238, 239 R, 408/239 A, 231, 232, 233; 407/47, 49, 108

[56] References Cited

U.S. PATENT DOCUMENTS

| | | | |
|---|---|---|---|
| 421,176 | 2/1890 | Lea | 408/233 |
| 1,201,614 | 10/1916 | Oakley | |
| 1,232,980 | 7/1917 | Rossignol | 408/233 |
| 1,337,015 | 4/1920 | Heinkel | 408/231 |
| 2,376,446 | 5/1945 | Morris | 407/49 |
| 3,122,031 | 2/1964 | Farndale | 408/153 |
| 3,363,485 | 1/1968 | Holloway | 408/232 |
| 3,363,486 | 1/1968 | Fourison | 408/232 |
| 3,455,188 | 7/1969 | Pratt et al. | 408/153 |
| 4,116,579 | 9/1978 | Hamilton | 408/233 |
| 4,270,422 | 6/1981 | Anderson | 82/36 |
| 4,642,001 | 2/1987 | Gill et al. | 408/229 |
| 4,848,198 | 7/1989 | Royal et al. | 82/1.11 |

*Primary Examiner*—Daniel W. Howell
*Attorney, Agent, or Firm*—Charles W. Chandler

[57] ABSTRACT

A cutting tool that includes a boring bar, a cutter insert, and a mechanism for retaining the cutter insert on the bar. The bar is formed of tungsten carbide. A relatively short steel retaining element is mounted in the rear end of the bar. Internal threads are formed in the steel element but not in the tungsten carbide bar. The retaining mechanism includes an elongated threaded rod extending longitudinally within the bar into a retainer notch formed in the side surface of the shank of a cutter insert.

20 Claims, 2 Drawing Sheets

BORING BAR CUTTER TOOL

BACKGROUND OF THE INVENTION

1. Field of the Invention

This invention relates to cutting tools, and particularly to cutting tools that comprise an elongated boring bar, or tool holder, having one end thereof extending into a socket opening in a support mechanism and the other end equipped with a sharpened cutter insert. The elongated tool holder can be arranged to extend into a machined hole in a workpiece, whereby relative rotation between the tool holder and workpiece enables the cutter insert to machine the hole surface or form a circumferential groove in the hole surface.

2. Description of Prior Developments

It is often desirable to use tungsten carbide as boring bar material for the reason that such material has a relatively high modulus of elasticity and a relatively great stiffness. A boring bar usually has one end received into a socket structure in a supporting boring head or other relatively strong support structure. The other end of the boring bar carries a replaceable cutter insert. The boring bar has a cantilever relationship to the support structure, with the unsupported length of the boring bar often being six inches or more, measured from the mouth of the socket opening. The boring bar should be relatively stiff so that it will have minimal transverse flexure (bending) due to the cutting loads. A boring bar formed of tungsten carbide has a high degree of stiffness and resistance to chatter, caused by vibration.

Unfortunately, carbide is relatively brittle. When a carbide member is formed with external or internal threads, the mating threaded member can break or fracture the thread surfaces on the carbide member when the joint is tightened. In many cases boring bars comprsise a rear shank formed of tungsten carbide and a front shank formed of steel. The two shanks are brazed together to form an elongated boring bar. The tungsten carbide gives the bar good flexural strength, whereas the front steel shank provides a material that can be threaded to receive a screw for retaining the cutter insert.

In many boring bar arrangements, the cutter insert is a flat plate having sharpened side edges extending transversely to the bar longitudinal axis. In many cases the cutting edge of the insert is oriented to lie in a plane coincident with the bar longitudinal axis so that the cutting edge remains on the centerline of the workpiece during the machining operation. Under conventional practice a significant portion of the boring bar front end has to be cut away in order to support the cutter insert in a proper cutting position, i.e. with the cutting face in a plane coincident with the rear centerline. The requirement for removing a portion of the boring bar front end tends to weaken the bar, thus reducing the bar's rigidity and promoting chatter.

U.S. Pat. No. 1,201,614 issued Oct. 17, 1916 to John Oakley, discloses an expanding broaching tool having a rod extending through the body for cutting spiral grooves in the bore of a tubular object.

U.S. Pat. No. 4,642,001, issued Feb. 10, 1987 to Gioffrey Y. Gill, Paul H. Hunter, and Gerard W. Venlet, discloses a spade drill with a replaceable cutting insert. The drill body has grooves for an internal coolant flow.

U.S. Pat. No. 4,848,198, issued Jul. 18, 1989, to Harold J. Royal and Randall E. Deemer, discloses a chip breaking tool holder for replaceable cutting tools. It includes a fluid coupler and seal assembly.

U.S. Pat. No. 4,270,422, issued Jun. 2, 1981 to Ken G. E. Andersson, discloses a cutting tool with a detachable cutting insert. A draw bar holds the insert in positon.

U.S. Pat. No. 4,116,579, issued Sept. 26, 1978 to Martin Norman Hamilton, discloses an end mill tool having an axial bore. A draw bar extends through the bore to pin the cutting insert to the body of the tool.

SUMMARY OF THE INVENTION

The present invention contemplates a boring bar formed primarily of tungsten carbide. A short steel retaining insert is provided at the rear end of the bar. The unsupported (cantilever) portion of the bar is formed entirely of tungsten carbide or other similar structural material having a high stiffness (modulus of elasticity).

The retaining insert has a threaded through hole adapted to receive the threaded end of a retrainer rod that extends axially essentially the full length of the bar, through on axial hole. The front end of the rod engages a retrainer notch in a cutter insert located at the front end of the bar.

The cutter insert has a cylindrical shank received into a transverse cylindrical passage formed in the front end of the boring bar. The cylindrical passage provides extensive lateral support for the cutter insert without appreciably weakening the bar front end. The cutting action can proceed with a minimal tendency of the bar to chatter.

The cutter insert is firmly held on the front end of the boring bar by means of the retrainer rod. A V-shaped notch in the cutter insert shank receives a conical end of the retrainer rod. The rod engages the notch to cam the insert toward its cutting position.

As previously noted, the boring bar is formed primarily of tungsten carbide or similar material having a high modulus of elasticity. The cutter insert is retained on the front end of the boring bar without the use of any threaded openings in the carbide surface. The retainer rod has a threaded connection with a steel retaining insert a the rear end of the bar. The retaining insert carries the rod loading. Preferably the entire unsupported (cantilever) length of the bar is formed out of carbide material.

THE DRAWINGS

DESCRIPTION OF THE PREFERRED EMBODIMENT OF THE INVENTION

Figure 1:
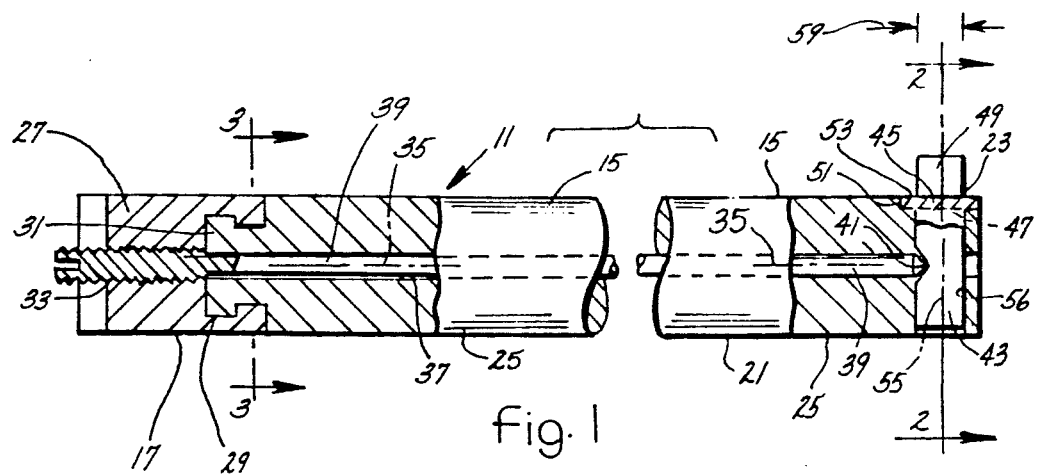
FIG. 1 is a fragmentary side elevational view of a cutting tool embodying features of the invention. Portions of the tool are shown in section.

FIG. 1 shows a cutting tool 11 of the present invention adapted to be supported in a conventional boring bar tool holder. The cutting tool comprises an elongated cylindrical boring bar 15 having a rear end portion 17. The front end portion 21 of the boring bar carries a cutter insert 23.

The cylindrical boring bar can be made in various diameters and lengths, depending on job requirements. Typically the boring bar diameter will be about three eighths inch or greater. The boring bar length can be about three inches or greater. The rear portion of the bar is shown as being cylindrical; however, it could also have a non-circular cross section, i.e. square or hexagonal.

Boring bar 15 is preferably a two piece construction, comprising a relatively long major bar member 25 formed of tungsten carbide, and a relatively short retraining bar element 27 formed of steel. The two bar elements may be connected together mechanically, via a tongue and groove joint, and/or metallurgically via a brazed connection. As shown in FIG. 1, the tongue and groove joint comprises a dovetail slot 29 extending transversely across (in) the front end of the retraining element 27, and a mating T-shaped rib 31 extending transversely across the rear end of carbide member 25. The slot-rib fit may be a tight press fit.

Steel element 27 has a threaded hole 33 extending therethrough along the longitudinal axis 35 of the boring bar. Carbide member 25 has a smooth surfaced circular hole 37 aligned with threaded hole 33. Retrainer rod 39 is inserted through the aligned openings to operatively engage a V-shaped notch 41 in cylindrical shank 43 of cutter insert 23. The purpose of rod 39 is to hold (retain) cutter insert 23 in an operative cutting position on the front end of the boring bar.

Cutter insert 23 has a flat base portioon 45 whose lower flat surface 47 is adapted to abut against a flat chordal surface 49 formed on bar 15. Straight side edge 51 of base portion 45 engages a trans-verse shoulder 53 formed by the matchining operation used to define chordal surface 49. The engagement between edge surface 51 and shoulder 53 prevents the cutter insert from tuning around the transverse axis 55 defined by cylindrical shank 43.

As shown in FIG. 1, cylindrical shank 43 telescopes into a mating cylindrical passage (drilled hole) 56 formed in boring bar 15. The axis 55 of the passage intersects the longitudinal axis 35 of the boring bar. The cutter insert has a flat shaped-edged cutting face 57 extending in a plane coincident with boring bar axis 35, as viewed in FIG. 2. When the boring bar is located in a hole in a workpiece, and is rotated around the boring bar axis, the cutter insert forms a circumferential groove in the hole sidewall. Numeral 59 denotes the width of the groove that can be formed with the illustrated cutting tool, as shown in FIG. 1.

Figure 4:
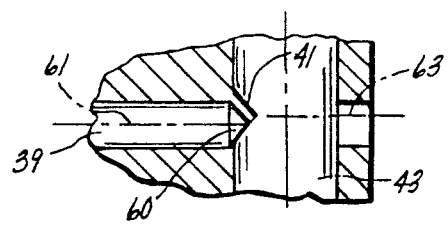
FIG. 4 is a fragmentary view illustrating a structural detail used in the FIG. 1 embodiment.

Cutting insert 23 is held firmly on the boring bar by means of retrainer rod 39. The rear portion of the rod is threaded to mesh with threaded hole 33 in steel retaining element 27, whereby the rod can be advanced into notch 41 in shank 43. The front end 60 of rod 39 has a conical surface configuration having the same angulation (cone angle) as the intersecting flat surfaces of notch 41. Also, the rod centerline 61 (FIG. 4) is slightly offset from notch centerline 63 such that movement of the rod into the notch (by a screw driver engaging the rod rear end) causes conical end 60 to cam the notch surface and the cutter insert into a tight abutment with flat chordal surface 49 (FIG. 1).

Whenever it is desired to replace the cutter insert, retainer rod 39 is unscrewed from retaining bar element 27 to retract the rod from notch 41. It will be noted that rod 39 has a threaded engagement only with steel retaining element 27. The carbide bar member is threadless. Steel element 27 is relatively short, commensurate with its function as a threaded member for threaded rod 39. Carbide member 25 is elongated to provide the cantilever bar with the stiffness necessary to prevent chatter (vibration) at the cutter insert.

Figure 3:
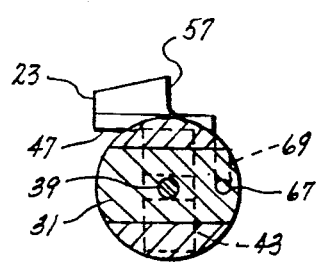
FIG. 3 is a transverse sectional view on line 3—3 of FIG. 1.
Figure 2:
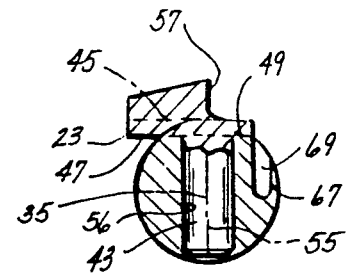
FIG. 2 is a transverse sectional view taken on line 2—2 in FIG. 1.
Figure 7:
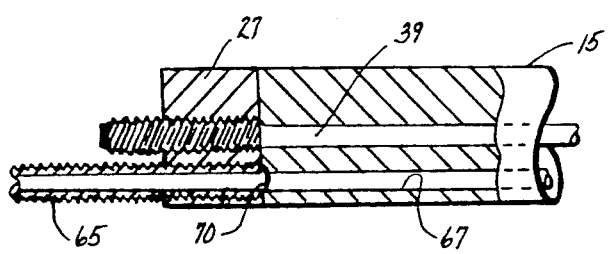
FIG. 7 is another sectioned view of the rear end of the bar.

In some cases it may be necessary or desirable to supply coolant to the cutter insert. FIGS. 2, 3 and 7 show a coolant supply system that can be used with boring bars of the present invention. FIG. 7 shows a steel threaded coolant nozzle 65 received in retraining element 27. The hollow nozzle delivers coolant to a central coolant passage 67 extending through the boring bar from its rear end to a point alongside shank 43, and a short shole (port) 69 extending from passage 67 to a point on the boring bar surface in advance of the cutting face 57 (as viewed in FIG. 2). The tip of nozzle 65 engages a conical inlet 70 in the bar at the rear end of passage 67.

The coolant passage system is used primarily where the cutting loads produce enough heat to potentially adversely affect cutter life. In some cases coolant is not required.

Figure 5:
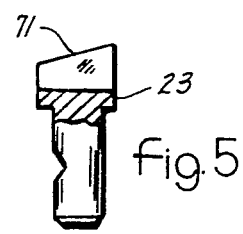
FIGS. 5 and 6 illustrate alternative cutter insert arrangements used in the practice of the invention.

FIG. 5 is a view taken in the samse direction as FIG. 1 (but showing only the cutter insert). The FIG. 5 cutter insert has an acutely angled outer edge 71, such that the cutter forms a groove having a slanted bottom surface. FIG. 5 is merely illustrative of the fact that the cutter profile can be varied, depending on the shape of the groove desired in the work surface.

Figure 6:
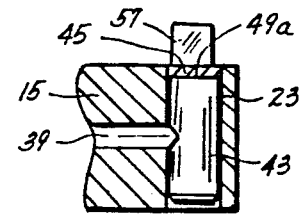

FIG. 6 shows a variant of the invention wherein the cutter flat base 45 is seated in a transverse groove machined in the boring bar side surface. The bottom surface of the groove forms a chordal surface 49a that serves the same function as chordal surface 49 in the FIG. 1 arrangement. Side surfaces of the groove serve the same function as shoulder 53 (FIG. 1).

Figure 8:
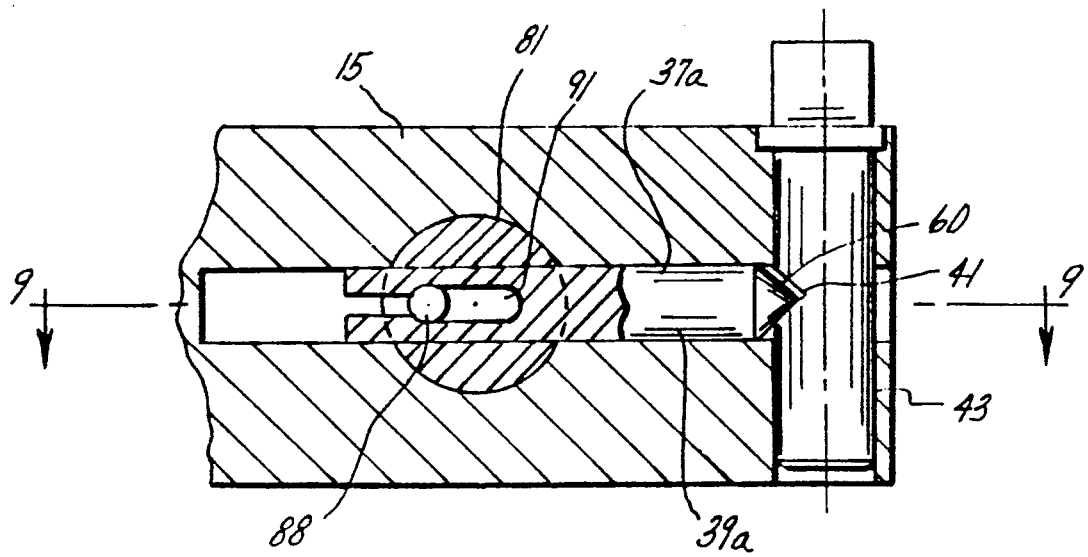
FIG. 8 is a view taken in the same direction as FIG. 1, but illustrating another form of the invention.
Figure 9:
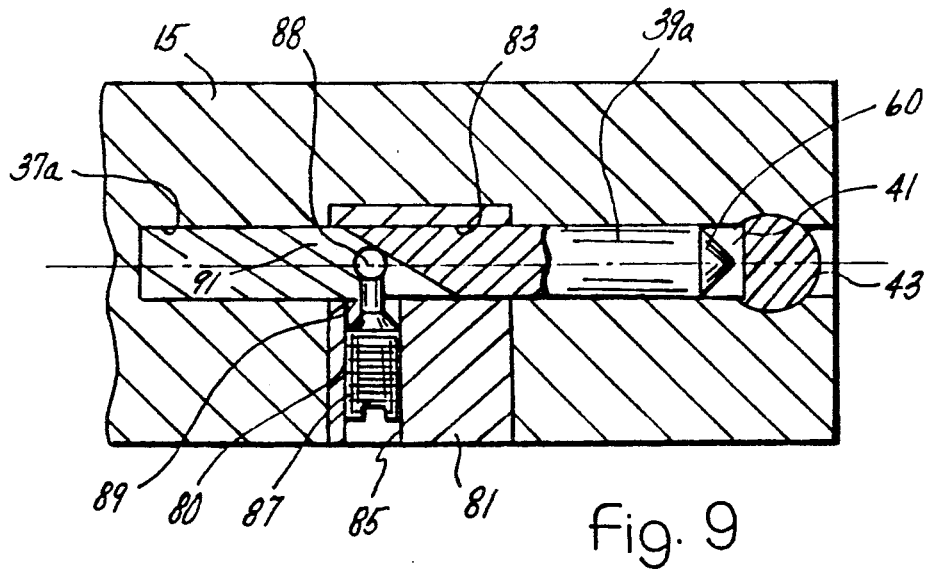
FIG. 9 is a sectional view taken on line 9—9 in FIG. 8.
Figure 10:
FIG. 10 is a bottom view of a retrainer rod used in the FIG. 8 construction.

In some cases the boring bar can be relatively long, e.g. sixteen inches or more in length. It then becomes somewhat difficult to maintain close tolerances on hole 37 and rod 39; also the elongated rod is subject to bending. FIGS. 8 and 9 show an alternate retainer rod arrangement that can be used with relatively long boring bars. A relatively short cylindrical retainer rod 39a is slidably positioned within a relatively short cylindrical bore 37a at the front end of the tungsten carbide boring bar 15. The rear end of the boring bar (not shown) can comprise a steel section similar to steel element 27 shown in FIG. 1.

Retainer rod 39a will typically have a length of two or three inches, whereas the boring bar can have a total length of about sixteen inches or more. The front end of rod 39a has a conical surface configuration 60 for interaction with the notch 41 surface in cutter insert shank 43. The cutter insert can be similar to the cutter insert shown in FIG. 1.

Retainer rod 39a is moved axially into or out of notch 41 by a cam mechanism 80 housed within a steel plug 81. Plug 81 is inserted radially into a mating cylindrical pocket in the side surface of the carbide boring bar. The plug is then brazed to the carbide so that the plug becomes an integral part of the bar structure.

Plug 81 has a circular hole 83 that aligns with bore 37a when the plug is installed in bar 15. A threaded hole 85 in the plug accommodates a screw 87 whose inner end 88 has a ball configuration. A narrow cylindrical neck 89 connects ball 88 with the threaded shank portion of the screw.

Retainer rod 39a is machined internally to form a cam follower slot 91 acutely angled to the rod axis. Slot 91 has a keyhole cross-sectional configuration, with the large portion of the keyhole being circular, and with the narrow neck portion of the key hole being a straight slot having a width slightly greater than the diameter of cylindrical neck 89 of screw 87.

FIG. 9 shows screw 87 threaded into hole 85 to a position wherein rod 39a has been cammed rightwardly into notch 41. Ball 88 acts as the cam element, and slot 91 acts as the cam follower. Radial motion of screw 87 translates into axial motion of retainer rod 39a.

When screw 87 is threaded radially away from the rod 39a axis, ball 88 exerts a downward pulling action on the slot 91 surfaces, whereby rod 39a is then drawn axially out of notch 41.

A point of interest is that the cam mechanism (screw 87) is threaded into steel plug 81, not the carbide bar. The carbide member can be threadless. Another feature of interest is the one piece cam construction. A single screw 87 provides the cam function.

In many respects, the arrangement of FIGS. 8 and 9 is similar to the arrangement depicted in FIG. 1. The essential difference between the two arrangements is that in FIG. 1 retainer rod 39 is threadably connected to steel element 27 so that rod adjustment is achieved directly via screw driver action. In the arrangement of FIGS. 8 and 9, retainer rod 39a is adjusted by the cam action of a separate screw 87. Retainer rod 39a can be relatively short, such that the length of boring bar 15 has no adverse limiting effect on the retainer rod operation.

Various forms of the invention are shown in the drawings. However, it will be appreciated that the invention can be practiced in other forms and configurations.

What is claimed is:

1. A cutting tool comprising an elongated boring bar having a longitudinal axis; said bar having a front end and a rear end; a chordal flat formed on the bar at its front end; a passage extending from the chordal flat transversely through the bar normal to its longitudinal axis; a cutter insert having a shank extending within the passage, and a radial seating surface abutting the chordal flat; and means for removably retaining the cutter insert on the boring bar; said retaining means comprising a notch formed in a side surface of the shank, and an axially adjustable retainer rod extending longitudinally within the boring bar; said rod having one end thereof extending into said notch to prevent withdrawal of the shank from the passage.

2. The cutting tool of claim 1, wherein said boring bar has a rear end portion thereof formed of steel; said steel portion having an internally threaded hole extending therethrough; said retainer rod having a threaded portion thereof meshed with the threaded hole whereby rotation of the rod advances the rod into said notch in the shank of the cutter insert.

3. The cutting tool of claim 1, wherein said cutter insert is a one piece structure.

4. The cutting tool of claim 2, wherein said shank and said passage have mating cylindrical cross sections; said chordal flat defining a transverse shoulder, and said cutter insert having a straight side edge surface abutting said shoulder to prevent rotation of the cutter insert around the axis of the cylindrical passage.

5. The cutting tool of claim 1, wherein said boring bar has a rear end portion thereof formed of steel, and a front end portion thereof formed of tungsten carbide; said steel portion having an internally threaded hole extending therethrough; said retainer rod having a threaded portion thereof meshed with the threaded hole whereby rotation of the rod advances the rod into said notch in the cutter insert shank.

6. The cutting tool of claim 5, wherein the tungsten carbide portion of the bar has an axial length that is substantially greater than the axial length of the steel portion.

7. The cutting tool of claim 6, wherein the tungsten carbide portion of the boring bar is threadless.

8. The cutting tool of claim 6, wherein the boring bar has a cylindrical cross section, and the retainer rod is located on the longitudinal axis of the cylindrical boring bar.

9. The cutting tool of claim 1, wherein said notch is defined by two flat intersecting notch surfaces acutely angled to the shank side surface; said one end of the retainer rod having a conical surface configuration mated to the notch surface contour.

10. The cutting tool of claim 9, wherein the retainer rod centerline is slightly offset from the notch centerline, whereby advancement of the rod into the notch increases the pressure of the cutter insert seating surface on the chordal flat.

11. The cutting tool of claim 1, wherein the boring bar has a cylindrical cross section; said retainer rod being located on the longitudinal axis of the cylindrical boring bar; said passage being a cylindrical passage having its axis intersecting the boring bar longitudinal axis; said cutter insert having a radially extending cutting face extending in a plane coincident with the boring bar axis and passage axis.

12. The cutting tool of claim 1, wherein said boring bar has a rear end portion thereof formed of steel, and a front end portion thereof formed of tungsten carbide; said steel portion having a transversely extending dovetail slot at the interface with the tungsten carbide portion; said tungsten carbide portion having a mating dovetail rib fitting within the slot to form a mechanical connection between the steel portion and the tungsten carbide portion.

13. The cutting tool of claim 1, and further comprising a plug extending within said boring bar near its front end; said retainer rod extending through said plug; said rod having a cam follower slot therein acutely angled to the rod axis; and a cam mechanism mounted in said plug for movement in a radial direction; said cam mechanism having a cam element located within the cam follower slot, whereby radial motion of the cam mechanism is translated into axial motion of the retainer rod.

14. The cutting tool of claim 13, wherein said cam mechanism comprises a screw, said cam element being a ball carried on one end of the screw.

15. The cutting tool of claim 14, wherein said cam follower slot has a keyhole cross section.

16. A cutting tool for machining a circumferential groove in a hole surface; said tool comprising an elongated cylindrical boring bar having a longitudinal axis;

said boring bar having a rear end portion adapted to be supported by a support means, and a front end portion locatable within a hole constituting the work to be machined; a chordal flat formed on the bar at its front end; a cylindrical passage extending from the chordal flat transversely through the bar; a cutter insert having a cylindrical shank extending within the cylindrical passage, and a radial seating surface abutting the chordal flat; and means for removably retaining the cutter insert on the boring bar; said retaining means comprising a notch formed in a side surface of the cylindrical shank, and a retainer rod extending longitudinally within the boring bar; said retainer rod having one end thereof extending into said notch to prevent withdrawal of the shank from the cylindrical passage.

17. The cutting tool of claim 16, wherein said boring bar comprises a relatively long front bar element made out of tungsten carbide and a relatively short rear bar element made out of steel; said steel element having a threaded hole extending therethrough in mesh with a threaded area of the retainer rod; said tungsten carbide element being threadless.

18. The cutting tool of claim 16, wherein said notch is defined by two flat intersecting notch surfaces acutely angled to the shank side surface; said one end of the retainer rod having a conical surface configuration adapted to exert a cam action on one of the notch surfaces when the rod is advanced into the notch.

19. The cutting tool of claim 18, wherein the retainer rod centerline is slightly offset from the notch centerline, whereby advancement of the rod into the notch increases the pressure of the cutter insert seating surface on the chordal flat.

20. The cutting tool of claim 16, and further comprising a radially movable cam mechanism contained within the boring bar for moving said retainer rod into or out of the notch in the cutter insert shank.

* * * * *